United States Patent Office 3,343,222
Patented Sept. 26, 1967

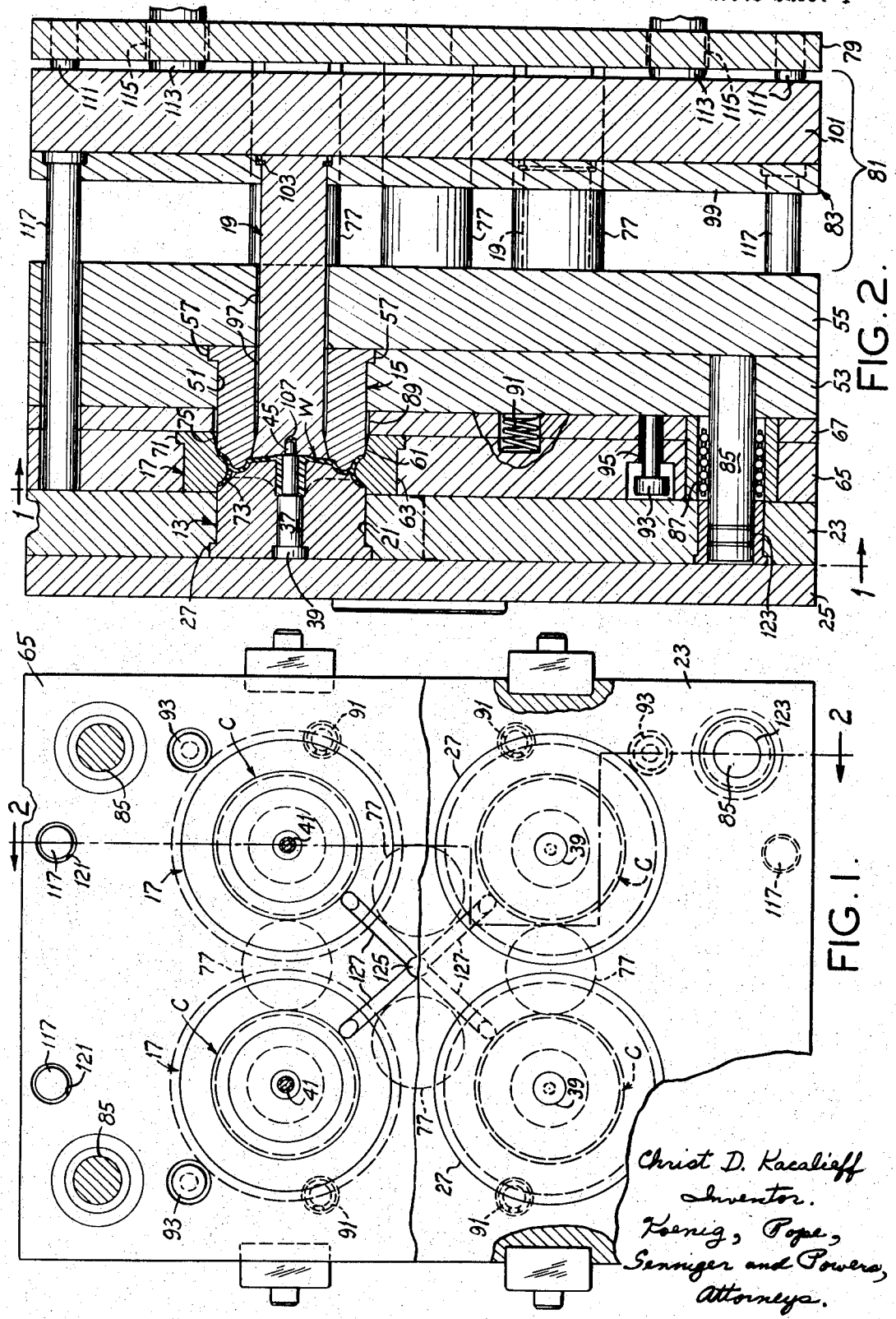

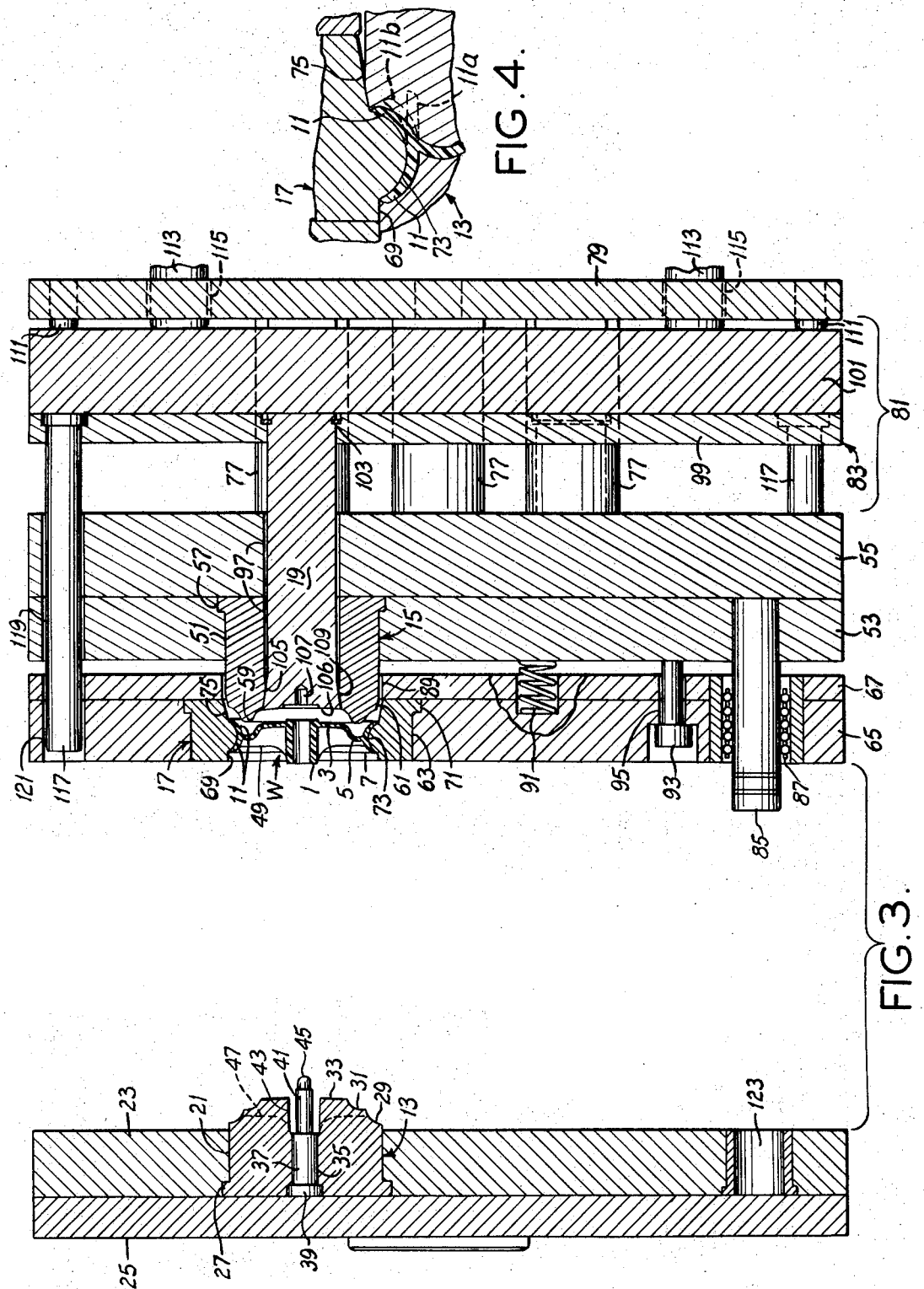

3,343,222
MOLDING APPARATUS
Christ D. Kacalieff, Clayton, Mo.
(1200 Madison Ave., Madison, Ill. 62060)
Filed Dec. 12, 1963, Ser. No. 330,120
9 Claims. (Cl. 18—42)

This invention relates to molding, and more particularly to the molding of plastic parts having a grooved rim, especially plastic wheels having such a rim for reception of a rubber tire.

Heretofore, the molding of plastic wheels of the grooved-rim type has been carried out utilizing laterally retractable die elements defining the periphery of the wheel, these die elements being spread apart laterally in a plane at right angles to the axis of the molded wheel for retraction of the groove-defining portions of the die elements from within the peripheral groove of the molded wheel so that the wheel (which, as molded, is relatively rigid) may be removed from the mold. The requirement for construction of the mold with such laterally retractable die elements limits the number of mold cavities which may be provided in the mold for a given mold base.

Among the several objects of this invention may be noted the provision of an apparatus for molding plastic wheels of the grooved-rim type, or other similar parts, in which ejection of the molded wheel is acomplished without requiring lateral retraction of any die elements, thereby enabling provision in a mold of more mold cavities for a given mold base, thereby enabling considerable increase in production rates as regards prior molds; the provision of such an apparatus which enables reduction in mold costs as regards prior molds for molds of comparable quality; and the provision of such an apparatus particularly suitable for the injection molding of such wheels or like plastic parts. Other objects and features will be in part apparent and in part pointed out hereinafter.

The invention accordingly comprises the constructions hereinafter described, the scope of the invention being indicated in the following claims.

In the acompanying drawings, in which several of various possible embodiments of the invention are illustrated, FIG. 1 is a transverse section taken generally on line 1—1 of FIG. 2, showing a molding apparatus of this invention;

FIG. 2 is a longitudinal section taken on line 2—2 of FIG. 1, showing various die elements of the apparatus in closed position;

FIG. 3 is a view corresponding to FIG. 2 but showing the die elements in open position; and FIG. 4 is a fragmentary section showing a modification.

Corresponding reference characters indicate corresponding parts throughout the several views of the drawings.

Referring to FIGS. 1–3 of the drawings, there is illustrated a four-cavity molding apparatus constructed in accordance with this invention for injection molding of four plastic wheels on each mold cycle. Each of the four mold cavities is designated C, and the wheel molded in each cavity is designated W. One of the cavities and the wheel molded therein appears in FIG. 2. While a four-cavity molding apparatus is shown, it will be understood that the principles of the invention are applicable to molding apparatus having any practical number of cavities, including a single cavity. As shown, wheel W is a disk wheel having a tubular central hub 1, a generally radial disk 3 with an annular stiffening rib 5, and a grooved peripheral rim 7 adapted for reception of a rubber tire. Rim 7 is constituted by curved lips 11 flaring outward on opposite sides of the central radial plane of the wheel.

As to each of the four cavities C, the apparatus includes a pair of dies 13 and 15, which define the sides of the cavity and which may therefore be referred to as side dies, and an intermediate die 17, which defines the periphery of the cavity and which may therefore be referred to as the peripheral die. Also, as to each of the four cavities, there is an ejector 19 for ejecting the molded wheel W from within the peripheral die 17, as will appear.

Each of the four side dies 13 (which are the left side dies as illustrated in FIGS. 2 and 3) is fitted in an opening 21 in a die plate 23. This plate 23 is secured on the face of the stationary platen 25 of a conventional injection molding machine. Each die 13 is of cylindrical shape, with a head 27 at its end toward platen 25 received in an enlarged end portion of the opening 21. The die 13 projects from the plate 23 and its outer end is formed to define one side (the left side, as herein illustrated) of the wheel W, having for this purpose an annular recess 29 shaped according to the outside of the left lip 11 of the wheel, an annular recess 31 shaped according to the left side of annular rib 5 of the wheel, and a slightly conical end face 33 shaped according to the left side of the disk 3 of the wheel. Die 13 also has an axial hole 35 receiving a pin 37. This pin has a head 39 at its end toward platen 25 received in an enlarged left end portion of the hole 35, a reduced-diameter shank 41 within an enlarged right-end portion 43 of the hole 35, and a further reduced tip 45. The annular space around shank 41 constitutes the space in which the hub 1 of the wheel is molded. The projecting end of the die 13 may have slots as indicated at 47 for molding the wheel with radial ribs or fins such as are indicated at 49 in FIG. 3.

Each of the four side dies 15 (which are the right side dies as illustrated in FIGS. 2 and 3) is fitted in an opening 51 in a die plate 53 which is secured on the face of a backing plate 55. Each die 15 is of a cylindrical shape with a head 57 at its end toward plate 55 received in an enlarged end portion of the opening 51. The die 15 projects from plate 51 and its outer end is formed as indicated at 59 to define the outside of the right lip 11 of the wheel and the left side of the annular rib 5 of the wheel. At its outer end, die 15 has a bevelled seat 61 for a puropse to be described.

Each of the four peripheral dies 17 is fitted in an opening 63 in a die plate 65 which is secured on the face of a backing plate 67. Each die 17 is of ring shape, having a central opening 69 therethrough, and has a head 71 at its end toward plate 67 received in an enlarged end portion of opening 63. The internal wall of ring-shaped die 17 within the opening 69 is formed with an annular rounded rib 73 extending completely around the opening. This rib defines the inside faces of lips 11 and the groove of the wheel. To the left of rib 73, opening 69 is cylindrical. To the right of rib 73, opening 69 is flared as indicated at 75 complementary to the bevelled seat 61 at the end of die 15.

Plates 53 and 55 carrying the side dies 15 are fixed on the outer ends of four rods 77 which extend forward from the movable platen 79 of the injection molding machine, with a space 81 between plate 79 and plate 55. An ejector plate assembly 83 is axially slidable on these rods in this space. The assembly of plates 65 and 67 carrying the peripheral dies 17 is axially slidable on guide rods 85 extending forward from plate 53. Bearings for free sliding of assembly 65, 67 on rods 85 are provided as indicated at 87. Plate 67 has holes as indicated at 89 for receiving the forward (left) ends of the side dies 15. Assembly 65, 67 carrying the peripheral dies 17 is movable relative to plate 53 between the wheel-release position spaced from the face of plate 53 in which it appears in FIG. 3 and the molding position engaging the face of plate 53 in which it appears in FIG. 2. It is biased outward to its wheel-release position by springs such as indicated at 91, this position of assembly 65, 67 (and of dies 17) being determined by its engagement with the heads of stop pins 93 extending through holes 95 in assembly 65, 67 and secured in plate 53. These pins hold assembly 65, 67 captive on the face of plate 53, with peripheral dies 17 in position between side dies 13 and 15, while permitting axial movement of dies 17 relative to dies 15.

Each ejector 19 is constituted by a cylindric plunger which extends forward (toward the left) from ejector plate assembly 83 through an axial hole 97 in the respective side die 15 and the plate 55. The ejector plate assembly comprises a face plate 99 secured on the face of a backing plate 101, the rear end of each ejector or plunger 19 being mounted in a hole in the face plate 99 as indicated at 103. Plunger 19 has a flaring forward end portion 105 and a dished (concave) forward end face 106, the latter being shaped to correspond to the right side face of disk 3 of the wheel W. Plunger 19 also has an axial hole 107 in its forward end for reception of tip 45 of the pin 37. The hole 97 in side die 15 has a flaring forward end 109 complementary to the flare 105.

The ejector plate assembly 83 normally occupies the retracted position relative to dies 15 in which it appears in FIGS. 2 and 3, back against stops 111 on the platen 79. It is slidable forward (toward the left) on rods 77 away from its retracted position for moving ejectors or plungers 19 forward relative to peripheral dies 17 for ejection of wheels therefrom as will appear. This ejecting movement of assembly 83 and ejectors 19 occurs after retraction of the entire assembly of plates 65, 67, 53 and 55 away from dies 13 by the movable platen 79 of the injection molding machine. It is effected by means of the usual ejector rods 113 of the injection molding machine working through holes 115 in the platen 79. Retraction of assembly 83 and ejectors 19 is effected on closing of the dies by means of push rods 117 extending forward from assembly 83 through holes 119 in assembly 53, 55 and holes 121 in assembly 65, 67, the forward ends of these rods being engageable with fixed plate 23. The latter has holes 123 for receiving the forward ends of rods 85 when the dies are closed.

Assembly 25, 23 has a sprue 125 for admission of the plasticized thermoplastic molding material, and runners 127 from the sprue to the mold cavities C for filling the latter. It will be understood that suitable channels (not shown) may be provided in plates 23, 65 and 53 for circulation of water to cool the dies, as is well understood in the art.

Operation is as follows:

As noted above, the left side dies 13 are stationary dies, being mounted on the stationary platen 25 of the injection molding machine. Side dies 15, peripheral dies 17 and ejectors 19 are all carried by the movable platen 79 of the injection molding machine and are movable thereby between the closed position in which they appear in FIG. 2 and the retracted position relative to dies 13 in which they appear in FIG. 3. In the closed position, plate 65 engages the face of plate 23, assembly 65, 67 is forced back against the bias of springs 91 into contact with plate 53, and ejector plate assembly 83 is retracted back against stops 111 so that ejectors 19 are retracted. The outer end of each side die 13 is entered in the left end of opening in the respective peripheral die 17, and closes opening 69 at the left. The outer end of each side die 15 is entered in the right end of opening 69 of the respective peripheral die 17, with flared surfaces 61 and 75 in engagement, closing the opening 69 at the right. The forward end of each ejector 19 is retracted back into the respective die 15, with flared surfaces 105 and 109 in engagement. The tip 45 of each pin 37 extends into hole 107 in the respective ejector 19. Under these circumstances, mold cavities C are fully defined, and plasticized molding material is injected via sprue 125 and runners 127 to mold wheels W in the mold cavities.

Upon completion of molding the wheels W, platen 79 is retracted, carrying with it the right side dies 15 and the peripheral dies 17 (see FIG. 3). Plate assembly 65, 67 which carries the peripheral dies 17, separates from plate 53 under the bias of springs 91. This moves the peripheral dies 17 to the left relative to the right side dies 15, so that the pinching effect of the right side dies 15 on the righhand lips 11 of the molded wheels W is relieved (note in FIG. 3 how the formation 59 at the end of die 15 is in effect backed off from the right-hand lip 11 so that there is a space therebetween). Ejector rods 113 ae then moved toward the left (by the usual ejector rod operating mechanism of the injection molding machine) to slide ejector plate assembly 83 toward the left on rods 77. This moves ejectors or plungers 19 forward (to the left) and they push the molded wheels W axially to the left out of the openings 69 in the peripheral dies 17. As each ejector 19 pushes the respective wheel to the left, the trailing lip 11 (the right-hand lip) flexes inward to pass through the constricted part or throat of opening 69 bounded by the rib 73 in the opening and then, when it has passed completely through this throat, it flexes back outward toward its position as originally molded. The wheels are molded of any suitable plastic material which, as molded, and with regard to the thickness and form of lips 11, is sufficiently flexible and resilient to permit the stated inward flexing and return flexing of the trailing lip 11, while being sufficiently rigid for wheel-forming purposes. In many instances, the trailing lip will flex back all the way to its position as originally molded, or so nearly all the way as to make no substantial difference. In some instances, however, particularly in the case of wheels with deeper grooves, the return flexing of the trailing lip may be appreciably less than its inward flexing which occurs as it is straightened out in passing through the throat of opening 69, and the ejected wheel would then be distorted. This problem may be eliminated as illustrated in FIG. 4 by forming the peripheral die 17 and the right side die 15 with an initial distortion or asymmetrical form, such as to compensate for the return or outward flexing of the trailing lip being less than the inward flexing of the lip. Note in FIG. 4 how these dies are formed so that the edge of the right-hand lip (i.e., the right side of the grooved rim) lies radially outward of the edge of the other lip and closer to the central radial plane of the wheel. In FIG. 4, the dotted lines 11a indicate how the right-hand lip flexes inward as it passes through the throat of opening 69, and the dotted lines 11b indicate its position after return flexing.

From the above, it will appear that the present invention encompasses the apparatus for molding the wheel (or like part with a grooved rim) in an opening in a die which is shaped within the opening for molding the groove, and then pushing the wheel axially out of the groove. This is carried out without lateral retraction or lateral spreading of peripheral die elements, thereby eliminating any necessity for use of a split peripheral die and mechanism for effecting lateral opening and closing of split peripheral die elements as in prior molds. This enables provision of a greater number of mold cavities in a mold for any given mold base, thereby enabling increased production rates as regards prior molds. For example, four mold cavities may be provided in a mold utilizing the present invention where only two may be provided for the same mold base using laterally retractable die elements, thereby doubling the production rate.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for molding plastic wheels having a central hub, a generally radial disc, and a grooved peripheral rim, the latter being constituted by a pair of curved lips flaring outwardly on opposite sides of said radial disc, said apparatus comprising a fixed side die having an end formation shaped for molding one side of said disc and one side of one of said curved lips, a movable side die coaxial with said fixed side die movable from a retracted position toward the fixed die and back to retracted position, said movable side die having an axial hole and an end formation shaped for molding one side of the other of said curved lips, an ejector axially slidable in said hole relative to said movable side die away from and back to a retracted position, said ejector having an end formation shaped for molding a major portion of the other side of said disc, a continuous peripheral die mounted on the side of the movable die toward the fixed die for movement with the movable die and for axial movement relative to the movable die for axial separation of the peripheral die from the movable die, said peripheral die having an opening coaxial with the side dies and being formed internally of said opening with a formation for molding the other sides of said curved lips, means for retracting the ejector on movement of the movable side die and peripheral die toward the fixed side die, said peripheral die then engaging said fixed side die and said movable side die engaging said peripheral die to provide in conjunction with the retracted ejector a mold cavity, and means for axially separating said peripheral die from said movable side die on retraction of the latter, said ejector then being movable axially relative to the movable side die to push a molded wheel axially out of the opening in the peripheral die, as permitted by inward flexing of the other of said curved lips to pass through said opening.

2. Apparatus as set forth in claim 7 wherein the fixed side die is provided with an annular space for molding the central hub.

3. Apparatus as set forth in claim 1 wherein the movable side die is carried by a movable side die plate, said movable side die plate having guide rods extending outward therefrom in the direction toward the fixed die, and said peripheral die being carried by a peripheral die plate slidable on said guide rods.

4. Apparatus as set forth in claim 2 carrying said flexed side die, an ejector plate carrying said ejector, and means mounting said ejector plate for axial sliding movement in back of said movable side die, said means for retracting the ejector comprising push rods extending from said ejector plate toward the fixed die plate.

5. Apparatus as set forth in claim 3 having means for holding said peripheral die plate captive on said guide rods while permitting limited movement thereof on said rods.

6. Apparatus as set forth in claim 1 wherein the peripheral die and the movable side die are of distorted form in relation to the final form of the wheel to compensate for return flexing of the other of said curved lips less than its inward flexing.

7. Apparatus for molding plastic wheels having a central hub, a generally radial disc, and a grooved peripheral rim, the latter being constituted by a pair of curved lips flaring outwardly on opposite sides of said radial disc, said apparatus comprising a fixed side die plate and a movable platen, the latter being movable from an open retracted position toward the fixed side die plate to a closed position and back to retracted position, a first side die carried by the fixed side die plate having an end formation shaped for molding one side, said disc and one side of one of said curved lips, rods extending from the movable platen toward the fixed side die plate, a second side die plate mounted on the ends of said rods so as to be movable with said platen, with a space between the movable platen and said second side die plate, a second side die carried by said second side die plate and fixed with respect to the latter and coaxial with the first side die, said second side die having an axial hole and an end formation shaped for molding one side of the other of said curved lips, an ejector plate slidable on said rods in said space away from and back to a retracted position adjacent the movable platen, an ejector extending from said ejector plate through said axial hole in said second side die and slidable in said hole, said ejector having an end formation shaped for molding the other side of said disc, guide rods extending from said second side die plate toward said fixed side die plate; a peripheral die plate slidable on said guide rods, a peripheral die carried by said peripheral die plate coaxial with said side dies, said peripheral die plate being axially slidable on said guide rods for movement between a closed position engaging said second side die plate and a position separated from said second side die plate, said peripheral die having an opening coaxial wtih the side dies and being formed internally of said opening with a formation for molding the other sides of said curved lips, rods extending from the ejector plate engageable with the fixed side die plate on movement of the movable platen toward the fixed side die plate for retracting the ejector plate and the ejector, said peripheral die plate then being clamped between said side die plates, and said side dies, peripheral die and ejector then providing a mold cavity, and means for axially separating said peripheral die plate and the peripheral die from said second side die plate and said second side die on retraction of the movable platen, said ejector plate then being movable axially in the direction toward said second side die plate to push a molded wheel axially out of the opening in the peripheral die, as permitted by inward flexing of the curved lip toward said second die to pass through said opening.

8. Apparatus as set forth in claim 7 wherein said means for axially separating said peripheral die plate from said second side die plate comprises spring means biasing the former away from the latter, and wherein there is provided means for holding said peripheral die plate captive on said guide rods while permitting limited movement thereof on these rods.

9. Apparatus as set forth in claim 7 wherein the peripheral die and said second side die are of distorted form in relation to the final form of the wheel to compensate for return flexing of said curved lip less than its inward flexing.

References Cited

UNITED STATES PATENTS

| | | | |
|---|---|---|---|
| 1,687,797 | 10/1928 | Sachse | 18—42 |
| 2,272,718 | 2/1942 | MacLagan et al. | 249—67 |
| 2,302,367 | 11/1942 | Ericson. | |
| 2,327,665 | 8/1943 | Peat. | |
| 2,371,061 | 3/1945 | Milano | 18—42 X |
| 2,459,402 | 1/1949 | Zahn | 249—67 |
| 2,483,093 | 9/1949 | Harvey | 249—68 |

(References on following page)

UNITED STATES PATENTS

| | | | |
|---|---|---|---|
| 2,558,026 | 6/1951 | Wilson | 264—318 |
| 2,587,337 | 2/1952 | Lay | 264—318 |
| 2,718,032 | 9/1955 | Harvey | 249—67 X |
| 2,834,989 | 5/1958 | Kusnery | 249—68 |
| 2,899,705 | 8/1959 | Darlington. | |
| 2,946,102 | 7/1960 | Mills | 18—2 X |
| 2,938,232 | 5/1960 | Martin | 18—30 |
| 3,016,579 | 1/1962 | Schlitzkus. | |
| 3,020,594 | 2/1962 | Makowski | 264—328 X |
| 3,049,758 | 8/1862 | Drevalas | 18—42 |
| 3,064,310 | 11/1962 | Cooprider | 18—42 X |
| 3,086,245 | 4/1963 | Gits | 18—42 X |
| 3,141,197 | 7/1964 | Hahn | 18—30 |
| 3,193,884 | 7/1965 | Haynie et al. | 18—42 |
| 3,266,098 | 8/1966 | Bucy | 18—30 |

FOREIGN PATENTS 240,075  8/1962  Australia.

J. SPENCER OVERHOLSER, *Primary Examiner.*

ROBERT F. WHITE, J. HOWARD FLINT, JR.,
*Examiners.*

UNITED STATES PATENT OFFICE
CERTIFICATE OF CORRECTION

Patent No. 3,343,222  September 26, 1967

Christ D. Kacalieff

It is hereby certified that error appears in the above numbered patent requiring correction and that the said Letters Patent should read as corrected below.

Column 5, line 53, for the claim reference numeral "7" read -- 1 --; line 62, for "flexed" read -- fixed --; column 6, line 12, for "side, said" read -- side said --; same column 6, line 29, for "plate; a" read -- plate, a --.

Signed and sealed this 22nd day of October 1968.

(SEAL)
Attest:

Edward M. Fletcher, Jr.
Attesting Officer

EDWARD J. BRENNER
Commissioner of Patents